United States Patent
Holtan et al.

(10) Patent No.: US 6,973,359 B2
(45) Date of Patent: Dec. 6, 2005

(54) DEMAND-DRIVEN SCHEDULING SYSTEM AND METHOD

(75) Inventors: John Holtan, St. Paul, MN (US); Michael Kilen, Apple Valley, MN (US); John Maher, St. Paul, MN (US)

(73) Assignee: Synchrono, Inc., St. Paul, MN (US)

( * ) Notice: Subject to any disclaimer, the term of this patent is extended or adjusted under 35 U.S.C. 154(b) by 0 days.

(21) Appl. No.: 10/251,636

(22) Filed: Sep. 19, 2002

(65) Prior Publication Data

US 2004/0059451 A1 Mar. 25, 2004

(51) Int. Cl.[7] .............................................. G06F 19/00
(52) U.S. Cl. ........................ 700/100; 700/95; 708/8
(58) Field of Search ........................ 700/100, 90, 95; 705/8; 709/102

(56) References Cited

U.S. PATENT DOCUMENTS 5,523,952 A * 6/1996 Inada .......................... 700/100
5,880,960 A * 3/1999 Lin et al. ....................... 700/99
5,881,284 A * 3/1999 Kubo ............................ 709/100

FOREIGN PATENT DOCUMENTS

JP            61221905 A    * 10/1986

* cited by examiner

*Primary Examiner*—Jayprakash N. Gandhi
(74) *Attorney, Agent, or Firm*—Schwegman, Lundberg, Woessner & Kluth, P.A.

(57) ABSTRACT

A process is scheduled based on one or more tasks identified as control tasks from a set of tasks comprising part of a job. A desired work-in-progress load time level is set for each of the identified control tasks, and a time load on each of the identified control tasks is determined for each new job, each new job comprising one or more tasks. New jobs are released based on the desired work-in-progress load time level for one or more control tasks to approximately maintain the set desired work-in-progress load time level.

46 Claims, 2 Drawing Sheets

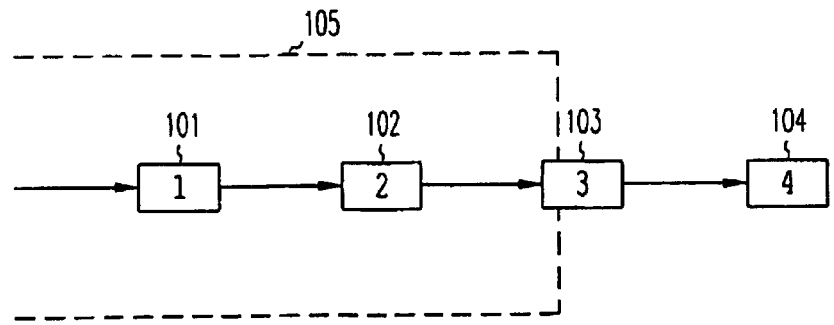
FIG. 1
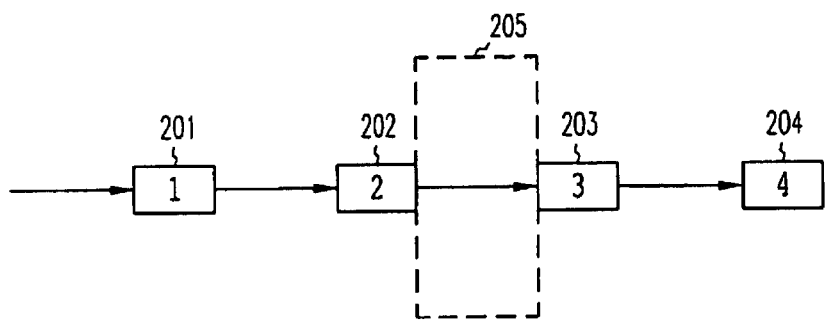
FIG. 2
| | 301 | 302 | 303 | 304 | 305 | 306 |
|---|---|---|---|---|---|---|
| ORDER NUMBER | RELEASE TIME | RELEASE LOAD HOURS RESOURCE A | ORDER LOAD HOURS RESOURCE A | RELEASE LOAD HOURS RESOURCE B | ORDER LOAD HOURS RESOURCE B |
| 100 | 10/25/2001 7:00 | 0 | 6 | 0 | 4 |
| 200 | 10/25/2001 7:00 | 6 (0+6) | 5 | 4 (0+4) | 5 |
| 300 | 10/25/2001 7:00 | 11 (6+5) | 9 | 9 (4+5) | 2 |
| 400 | 10/25/2001 7:00 | 20 (11+9) | 3 | 11 (9+2) | 6 |
| 500 | ? | ? | 5 | ? | 3 |
FIG. 3

DEMAND-DRIVEN SCHEDULING SYSTEM AND METHOD

FIELD OF THE INVENTION

The invention relates generally to scheduling, and more specifically to a system and method for planning and scheduling using one or more process control points.

BACKGROUND OF THE INVENTION

Many processes such as industrial manufacturing benefit from careful planning and scheduling to ensure that processing capacity is best utilized and to predict process capability. Careful management of parts and manufacturing capacity are but two examples of elements of a scheduling system that can significantly affect the efficiency of a process such as manufacturing.

Considerable expense in parts storage and in money spent too soon is encountered if too many manufacturing parts are on hand, while having too few parts on hand can result in idle time and unused capacity in a manufacturing line. Similarly, misscheduling stages of manufacturing can result in overproduction of parts if one stage manufactures parts without knowledge of a bottleneck at a later stage or can result in underproduction of parts if a stage is not used to its full potential and downstage manufacturing stages have excess capacity.

Consideration of factors such as these can minimize the expense of manufacturing by ensuring that only needed parts are ordered or produced, and by facilitating scheduling of various stages of manufacturing to ensure efficient operation. Such methods are valuable not only to ensure efficient production, but also to estimate the time needed to produce new products and to estimate the current backlog of work.

Problems such as these become more complex when multiple products or customized products are to be manufactured. Systems incorporating item master scheduling allow consideration of the time a given product needs to complete each stage of manufacturing, and various Materials Requirements Planning (MRP) and Enterprise Resource Planning (ERP) software packages use the run rate or rate of operation of a particular resource to do forward and backward scheduling of utilization of resources such as manufacturing stages.

The problem of optimization of such scheduling remains, and is sometimes estimated in sophisticated software packages with mathematical optimization algorithms. Even systems such as these are not easily able to account for changes or perturbations in supply chains, work rates, or other factors. Resource breakdowns, unpredictable processing rates and rework, and unpredictable demand all contribute to the statistical fluctuations present in such systems. When combined with inter-task dependencies, these statistical fluctuations form a scheduling problem that requires exploring each feasible schedule to determine which schedule is optimal or best. This leads to very long computational times and impracticality of some solutions, and makes expressing the problem and interpreting the result difficult. Process environments with a high degree of statistical fluctuation such as manufacturing, distribution, engineering, construction, health care, and scheduled service are particularly time-sensitive because each fluctuation introduced may require reoptimization of the entire schedule.

A need exists for a process scheduling system and method that facilitate accurate, efficient, and effective scheduling.

SUMMARY OF THE INVENTION

In one embodiment of the invention, a process is scheduled based on one or more tasks identified as control tasks from a set of tasks comprising part of a job. A desired work-in-progress load time level is set for each of the identified control tasks, and a time load on each of the identified control tasks is determined for each new job, each new job comprising one or more tasks. New jobs are released based on the desired work-in-progress load time level for one or more control tasks to approximately maintain the set desired work-in-progress load time level.

BRIEF DESCRIPTION OF THE FIGURES

FIG. 1 illustrates a method of scheduling jobs in which a desired work-in-progress level is maintained through all tasks or resources prior to a control task or resource, consistent with an embodiment of the present invention.

FIG. 2 illustrates a method of scheduling jobs in which the desired work in progress level is maintained only through jobs queued for a specific task, consistent with an embodiment of the present invention.

FIG. 3 is a table illustrating a method of scheduling jobs, consistent with an embodiment of the present invention.

DETAILED DESCRIPTION

Figure 4:
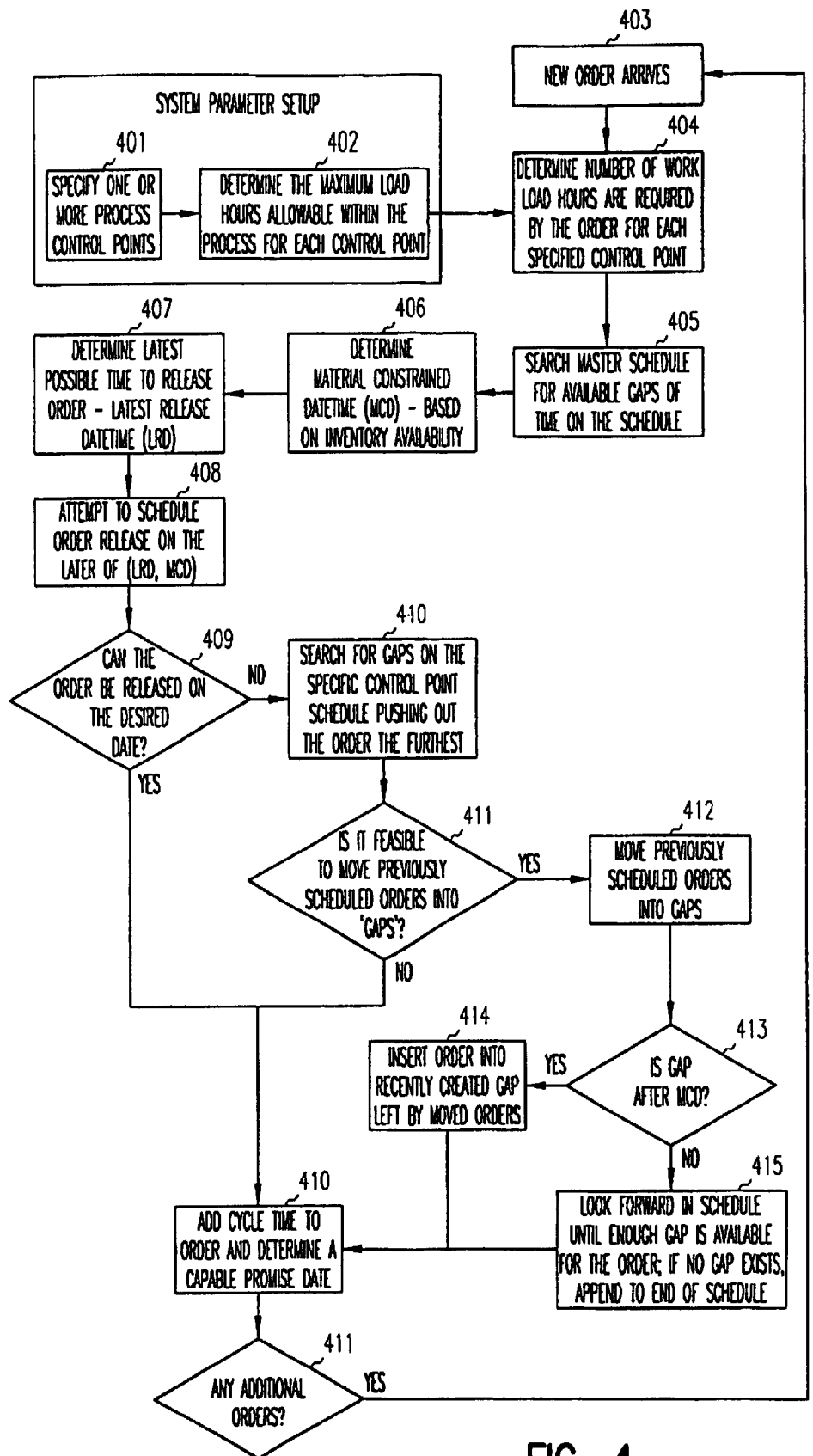
FIG. 4 is a flowchart showing a method of scheduling jobs, consistent with an embodiment of the present invention.

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention provides in various embodiments process scheduling systems and methods that facilitate accurate and efficient scheduling. The process is scheduled in some embodiments by identifying control tasks, and releasing new jobs to maintain a desired work-in-progress load time level for the control tasks. Alternate embodiments comprise identifying control resources, and releasing new jobs to maintain a desired work-in-progress load time level for the control resources.

FIG. 1 illustrates a method of practicing the present invention in which a desired work-in-progress level is maintained through all tasks or resources prior to a control task or resource. In this example stages 1 (101), 2 (102), 3 (103), and 4 (104) represent in various embodiments of the invention either tasks to be completed as part of a job or resources to be utilized in completion of a job.

As an example in which the stages represent tasks, 101 represents molding parts, 102 represents assembly of parts, 103 represents painting the assembly, and 104 represents packaging the painted assembly. Here, task 3, or painting the assembly at 103, is selected as a control task. The dashed line 105 includes within it all tasks previous to the control task, as well as the jobs that have completed parts assembly at 102 and are awaiting painting at 103. The jobs that have been started but are not yet being painted at 103 are contained within the dashed line 105, while jobs that are actually being painted at 103 or are in subsequent stages of production are not. The amount of work prior to the task 103 is referred to as the work in progress, which here includes all jobs previous to painting at 103.

New jobs are released in this embodiment of the invention only when the work in progress drops below a predetermined desired level. The desired work in progress level is in one embodiment of the invention a load time level that the work in progress represents to the control task 103, such as 20 hours worth of paint time at the painting control task 103. In this example, a new job will be released only when all jobs prior to painting at 103 comprise work in progress that will take less than 20 hours to paint. In an alternate embodiment, new jobs are released only when releasing the new job will not result in a number of work in progress jobs that exceed the desired work in progress time level. For example, if the desired maximum work in progress load time level for painting control task 103 is set at 30 hours, new jobs will be released only when releasing the job does not result in a work in progress load time level greater than 30 hours.

FIG. 2 illustrates an alternate method of practicing the invention in which the desired work in progress level is maintained only through jobs queued for a specific task. Similar to FIG. 1, 201 represents molding parts, 202 represents assembly of parts, 203 represents painting the assembly, and 204 represents packaging the painted assembly, with task 3, or painting the assembly at 203, selected as a control task. The dashed line 205 similarly represents the region of production in which work in progress is monitored to determine when to release new jobs.

In this example, work in progress region 205 is limited to the jobs that have completed assembly at 202 and are queued for painting at 203. A desired work in progress level for the region 205 is set, and is approximately maintained by releasing new jobs into production when the work in progress level within queue region 205 is below a desired value. Because the control task of painting at 203 is identified as a potential bottleneck, its queue of waiting work is particularly relevant to determination of the amount of work in progress or time load upon the process. The significance of this approach is explained further by Little's Law, which states that the amount of work in progress is proportional to the time taken to complete new work. It is therefore desirable to maintain work in progress at a level sufficient to ensure full utilization of potential bottlenecks, but also at a level not significantly greater than needed to ensure full bottleneck utilization.

The example systems illustrated in FIGS. 1 and 2 show examples of the present invention having a single control point. Various other embodiments of the invention will have multiple control points, and the control points in various further embodiments will represent potential bottleneck tasks or resources. In some embodiments having multiple control points, new jobs are only released upon each control point being below the desired work in progress level specified for each of the control points. In other embodiments, new jobs are released only when releasing a new job will result in the work in progress for each control point being at a time load level at or below a maximum work in progress level for each of the control points. Further embodiments of the present invention include having moving or recurring control points, such as lithography in a semiconductor process, which may occur several times and at various stages of the production process.

Control points in some embodiments of the invention are tasks or resources that represent bottlenecks in a scheduled process. For example, the task of painting or a paint booth resource may be a bottleneck in the example of FIGS. 1 and 2, resulting in selection of the painting task at 103 and 203 as the control point. If a task or resource is suspected to be a bottleneck, it can be selected as a control point and its effect on job release timing can be monitored. If a control point item is determined not to be a bottleneck, it may be removed as a control point, thereby simplifying the scheduling process.

FIG. 3 illustrates a more detailed example embodiment of the invention, including scheduling the release of orders according to the present invention. Orders are listed sequentially in the row 301, and their scheduled release time is indicated at 302. At 303, the cumulative released load hours for a first resource, resource "A", are listed, and the resource hours for resource "A" consumed by each new job are listed at 304. Similarly, the cumulative released load hours for a second resource "B" are listed at 305, and the resource hours for resource "B" consumed by each new job are listed at 306.

Further, each of the constraint resources "A" and "B" have a maximum time load in hours set. The maximum time load is selected based on material flow and other factors that influence the necessary queue of work needed to keep potential bottleneck or control resources fully utilized, but that is not greater than necessary to keep the control resources fully utilized consistent with Little's law. Here, material normally takes 15 hours to flow from release to each of the constraint resources "A" and "B", and addition of a five hour safety buffer results in a 20 hour maximum load time level for each resource.

In operation, the firs order 100 is scheduled for release as soon as production starts. There are no previous jobs, so the released load hours for both resources "A" and "B" are at zero. Addition of the job to the work in progress results in six hours of load on resource "A", and four hours load on resource "B". Next, order number 200 is scheduled as a job to be released at the same time as the first order 100, as the addition of five hours load to the six hours of work in progress already allocated to resource "A" does not result in exceeding the maximum desired limit of 20 load hours of work in progress, and the five hours of load time added to the already pending four hours of work in progress for load "B" does not result in exceeding the maximum desired limit of 20 load hours of work in progress for resource "B".

Similarly, orders 300 and 400 are released at the same time as orders 100 and 200 and the load hours for each of the control resources are added to work in progress, which remains below the maximum desired levels for both resources. When order 500 is scheduled, it can be seen from the chart of FIG. 3 that addition of the five hours to resource "A" would result in a work in progress level of 25 hours, which exceeds the maximum of 20 hours. Addition of three load hours to resource "B" upon the release of order 500 would result in only 14 load hours for cumulative work in progress, but the job will not be released because it would cause the load on resource "A" to exceed the maximum desired load limit. Release of order 500 will therefore be delayed until the work in progress level for resource "A" drops to 15 hours, so that addition of order 500's five hours does not cause the work in progress load on resource "A" to exceed the maximum desired load time of 20 hours.

In alternate embodiments of the invention, a new job is released whenever the work in progress load level for each resource is below the set desired work in progress level for the control resources or tasks, regardless of whether addition of the new job to work in progress causes work in progress to exceed a desired level. In still further embodiments of the invention, any variety of other suitable methods for maintaining work in progress at approximately a desired level are used.

FIG. 4 is a flowchart, illustrating a method of practicing the present invention. One or more control points are identified at 401, and the maximum load time is determined for each of the control points at 402. At 403, a new order arrives for scheduling, and the time load on each control resource for the new order or job is determined at 404. At 405, a master schedule is searched for available time, or for time that is not yet scheduled. Available time that will result in necessary inventory and materials being available is identified at 406, and at 407 the latest possible order release time that will ensure completion of the job by a desired completion time is identified. A scheduling attempt is then made at 408 for the later of the two determined times, so that the job will be scheduled for the last possible start time to complete the order by the desired date or as soon as sufficient material and inventory are available if started after the last possible start time to complete the order by the desired date.

At 409, it is determined whether the order or job can be released on the desired date. If it can be, cycle time is added to the order and an estimated completion date can be set at 410. Then, new orders are recognized at 411, which triggers a return to the new order arrival element 403.

If at 409 it is determined that the order cannot be released on the desired date, due to lack of available resource time or for other reasons, the schedule is searched for gaps on the schedule of one or more control points at 410. At 411, it is determined whether it is feasible to move previously scheduled orders into gaps to allow scheduling the new job at the desired date. If it is determined not feasible, the order is scheduled for the first sufficient block of available control point time at 410, and cycle time is added to determine an estimated completion time. If it is determined feasible to move previously scheduled orders into gaps, the previously scheduled orders are moved into gaps at 412. Then, it is determined at 413 whether the created gap is after the materials and inventory constrained start date, or whether the created gap is at a time when inventory and materials will be available for work on the job. If the created gap is after the materials and inventory constrained start date, the new order is inserted into the newly created gap at 414, and an estimated completion time can be calculated at 410. If the created gap is not after the materials and inventory constrained start date, the job is scheduled at the soonest available gap thereafter or appended to the end of the schedule at 415.

FIG. 4 illustrates through one example embodiment of the invention how factors such as inventory availability and gaps in control task or control resource scheduling are considered in some applications of the invention. Depending on the nature of the process that is scheduled, a variety of other considerations may be included in various embodiments of the invention. For example, in an assembly environment, some parts needed for production of a certain job will be scheduled to be released or even received after the job itself is released, resulting in a release date based on projected materials and inventory requirements that are not met but are anticipated to be met. Timely completion of the job will then be dependent on materials or inventory arrival or completion prior to the actual job's release date.

As a further example of other considerations, custom-order processes often desire that jobs be released at as late a date as is possible while still meeting the desired job completion date to allow the greatest opportunity for accommodating customer change requests. Such processes may also benefit from unreserved gaps in control resource utilization or in control task schedules to accommodate high-priority jobs with short lead times. Many other examples of such considerations and resulting scheduling preferences exist, and are within the scope of the present invention.

Prioritization of jobs within queues for various tasks or resources is further consistent with various embodiments of the invention, and can provide a process scheduling system the flexibility to handle jobs differently or to ensure that jobs meeting specific criteria are given specific priority. One such example involves looking at the percentage of a job's scheduled cycle time or total process lead time that has been consumed relative to other jobs in a particular queue. For example, if three jobs are waiting to be painted, and one of the jobs has been in process for three days of a five day production schedule while the other two have been in process for two days of a six day production schedule, the first job that has already consumed 60% of its production schedule will be dispatched before the other two jobs that have only consumed 33% of their production schedules. Such a percentage is termed a Process Complete Percent for purposes of the present invention.

Another example is calculation of what is designated Cycle Consume Percent, defined as the order cycle time minus the time remaining until the order due date, the difference divided by the order cycle time. If the cycle time is three days and a job is two days from its due date, the Cycle Consume Percent is 33%, irrespective of how much work has actually been completed. Priority is here given to the job having the highest Cycle Consume Percent within each queue, to ensure that those jobs most at risk of late completion are dispatched first.

A variation on Cycle Consume Percent and Process Complete Percent includes calculating a variance that is the difference of Process Complete Percent and Cycle Consume Percent for each job in a queue. Differences that are negative represent jobs that have fallen behind plan, and orders near zero are very close to falling behind plan and at risk of late completion. Priority is therefore given to jobs having the lowest value among the jobs in a particular queue, ensuring that jobs at the greatest risk of late completion are dispatched first.

Another variation of queue prioritization using a job's cycle time involves consideration of the amount of allocated buffer time that has been consumed. Buffer time is added to the estimated process time for each job to yield an anticipated cycle time, where the buffer time is used to anticipate variations and disruptions that may occur during a process. Process time remaining is subtracted from cycle time remaining, and the difference is divided by the total amount of buffer time added to compute the buffer consume percentage. Jobs having a higher buffer consume percentage within a queue are then given higher dispatch priority than jobs having a lower buffer consume percentage.

These are but examples of the various ways in which the present invention may be implemented. Further, the example applications of scheduling a process given here are but examples of processes to which the present invention may be applied. Other example applications of the present invention include scheduling construction, project management and scheduling, and scheduling or queuing operations within a computer or other information handling system.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed:

1. A method of scheduling a process, comprising:
   identifying one or more control tasks from a set of tasks comprising part of a job;
   setting a desired work-in-progress load time level for each of the identified control tasks;
   determining a time load on each of the identified control tasks for each new job, each new job comprising one or more tasks; and
   releasing new jobs based on the desired work-in-progress load time level for one or more control tasks to approximately maintain the set desired work-in-progress load time level.

2. The method of claim 1, wherein control tasks comprise tasks in a manufacturing process.

3. The method of claim 1, wherein control tasks comprise tasks identified as potential bottleneck tasks.

4. The method of claim 1, wherein setting a desired work-in-progress load time level comprises setting a desired work in progress load time level including all work in progress through all stages of work prior to the identified control task or tasks.

5. The method of claim 1, wherein releasing each new job based on the desired work-in-progress load time level comprises releasing each new job when there is sufficient capacity for one or more control tasks to add the new job to work-in-progress while remaining under the desired work-in-progress load time level for the one or more control tasks.

6. The method of claim 1, wherein releasing each new job based on the desired work-in-progress load time level comprises releasing a new job only when work-in-progress load time is under the set desired level.

7. The method of claim 1, wherein job tasks are dispatched based on assigned job priority levels.

8. The method of claim 7, wherein the job priority level is based on the job's time in process.

9. The method of claim 7, wherein the job priority level is based on the job's desired time of completion.

10. The method of claim 1, wherein new jobs are released only when only when sufficient inventory is available.

11. The method of claim 1, further comprising scheduling each new job based on the desired work in progress load time level for one or more control tasks to approximately maintain the set desired work in progress load time level.

12. A method of scheduling a process, comprising:
    identifying one or more control resources;
    setting a desired work-in-progress load time level for each of the identified control resources;
    determining a resource load time on each of the identified control resources for each new job; and
    releasing new jobs based on the desired work-in-progress resource load time level for one or more control resources to approximately maintain the set desired work-in-progress resource load time level.

13. The method of claim 12, wherein control resources comprise resources in a manufacturing process.

14. The method of claim 12, wherein control resources comprise resources identified as potential bottleneck resources.

15. The method of claim 12, wherein setting a desired work-in-progress load time level comprises setting a desired work in progress load time level including all work in progress through all stages of work prior to the one or more identified control resources.

16. The method of claim 12, wherein releasing each new job based on the desired work-in-progress load time level comprises releasing each new job when there is sufficient control resource capacity for one or more control resources to add the new job to work-in-progress while remaining under the desired work-in progress load time level for the one or more control resources.

17. The method of claim 12, wherein releasing each new job based on the desired work-in-progress load time level comprises releasing a new job only when work-in-progress load time is under the set desired level.

18. The method of claim 12, wherein jobs are dispatched to resources based on assigned job priority levels.

19. The method of claim 18, wherein the job priority level is based on the job's time in process.

20. The method of claim 18, wherein the job priority level is based on the job's desired time of completion.

21. The method of claim 12, wherein new jobs are released only when sufficient inventory is available.

22. The method of claim 12, further comprising scheduling each new job based on the desired work in progress load time level for one or more control resources to approximately maintain the set desired work in progress load time level.

23. A machine-readable medium with instructions encoded thereon, the instructions when executed operable to cause a computerized system to:
    identify one or more control tasks from a set of tasks comprising part of a job;
    set a desired work-in-progress load time level for each of the identified control tasks;
    determine a time load on each of the identified control tasks for each new job each new job comprising one or more tasks; and
    release new jobs based on the desired work-in-progress load time level for one or more control tasks to approximately maintain the set desired work-ill-progress load time level.

24. The machine-readable medium of claim 23, wherein said control tasks comprise tasks in a manufacturing process.

25. The machine-readable medium of claim 23, wherein said control tasks comprise tasks identified as potential bottleneck tasks.

26. The machine-readable medium of claim 23, wherein setting a desired work-in-progress load time level comprises setting a desired work in progress load time level including all work in progress through all stages of work prior to the identified control task or tasks.

27. The machine-readable medium of claim 23, wherein releasing each new job based on the desired work-in-progress load time level comprises releasing each new job when there is sufficient capacity for one or more control tasks to add the new job to work-in-progress while remaining under the desired work-in-progress load time level for the one or more control tasks.

28. The machine-readable medium of claim 23, wherein releasing each new job based on the desired work-in-progress load time level comprises releasing a new job only when work-in-progress load time is under the set desired level.

29. The machine-readable medium of claim 23, wherein job tasks are dispatched based on assigned job priority levels.

30. The machine-readable medium of claim 29, wherein the job priority level is based on the job's time in process.

31. The machine-readable medium of claim 29, wherein the job priority level is based on the job's desired time of completion.

32. The machine-readable medium of claim 23, wherein new jobs are released only when sufficient inventory is available.

33. The machine-readable medium of claim 23, the instructions further operable to cause the computerized system to schedule each new job based on the desired work progress load time level for one or more control tasks to approximately maintain the set desired work in progress load time level.

34. A machine-readable medium with instructions encoded thereon, the instructions when executed operable to cause a computerized system to:

identify one or more control resources;

set a desired work-in-progress load time level for each of the identified control resources;

determine a resource load time on each of the identified control resources for each new jobs; and release new jobs based on the desired work-in-progress resource load time level for one or more control resources to approximately maintain the set desired work-in-progress resource load time level.

35. The machine-readable medium of claim 34, wherein control resources comprise resources in a manufacturing process.

36. The machine-readable medium of claim 34, wherein control resources comprise resources identified as potential bottleneck resources.

37. The machine-readable medium of claim 34, wherein setting a desired work-in-progress load time level comprises setting a desired work in progress load time level including all work in progress through all stages of work prior to the one or more identified control resources.

38. The machine-readable medium of claim 34, wherein releasing each new job based on the desired work-in-progress load time level comprises releasing each new job when there is sufficient control resource capacity for one or more control resources to add the new job to work-in-progress while remaining under the desired work-in-progress load time level for the one or more control resources.

39. The machine-readable medium of claim 34, wherein releasing each new job based on the desired work-in-progress load time level comprises releasing a new job only when work-in-progress load time is under the set desired level.

40. The machine-readable medium of claim 34, wherein jobs are dispatched to resources based on assigned job priority levels.

41. The machine-readable medium of claim 34, wherein the job priority level is based on the job's time in process.

42. The machine-readable medium of claim 34, wherein the job priority level is based on the job's desired time of completion.

43. The machine-readable medium of claim 34, wherein new jobs are released only when only when sufficient inventory is available.

44. The machine-readable medium of claim 34, the instructions when executed further operable to cause the computerized system to schedule each new job based on the desired work in progress load time level for one or more control resources to approximately maintain the set desired work in progress load time level.

45. An information handling system, the information handling system operable to schedule a process by:

identifying one or more control tasks from a set of tasks comprising part of a job;

setting a desired work-in-progress load time level for each of the identified control tasks;

determining a time load on each of the identified control tasks for each new job, each new job comprising one or more tasks; and releasing new jobs based on the desired work-in-progress load time level for one or more control tasks to approximately maintain the set desired work-in-progress load time level.

46. An information handling system, the information handling system operable to schedule a process by:

identifying one or more control resources;

setting a desired work-in-progress load time level for each of the identified control resources;

determining a resource load time on each of the identified control resources for each new job; and releasing new jobs based on the desired work-in-progress resource load time level for one or more control resources to approximately maintain the set desired work-in-progress resource load time level.

* * * * *